(12) United States Patent
Hsu (10) Patent No.: US 8,374,481 B2
(45) Date of Patent: Feb. 12, 2013

(54) DIGITAL VIDEO RECORDER AND MANAGING METHOD

(75) Inventor: Ming-Yuan Hsu, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 197 days.

(21) Appl. No.: 12/908,009

(22) Filed: Oct. 20, 2010

(65) Prior Publication Data
US 2011/0293236 A1 Dec. 1, 2011

(30) Foreign Application Priority Data

May 28, 2010 (TW) ................................ 99117333 A (51) Int. Cl.
*H04N 5/77* (2006.01)
(52) U.S. Cl. .......................................... 386/223
(58) Field of Classification Search .................... 386/223
See application file for complete search history.

(56) References Cited

U.S. PATENT DOCUMENTS

| | | | |
|---|---|---|---|
| 2004/0179600 A1* | 9/2004 | Wells et al. | 375/240.12 |
| 2005/0057652 A1* | 3/2005 | Tagawa et al. | 348/154 |
| 2008/0094470 A1* | 4/2008 | Wong et al. | 348/143 |
| 2008/0287229 A1* | 11/2008 | Donahoe | 473/570 |

* cited by examiner

*Primary Examiner* — Thai Tran
*Assistant Examiner* — William Tran
(74) *Attorney, Agent, or Firm* — Altis Law Group, Inc.

(57) ABSTRACT

An electronic device and a corresponding managing method include arranging a plurality of cameras into two camera groups, and setting a switch interval. A plurality of analog to digital converters (ADCs) in the electronic device uses first channels to acquire a first image and a second image from each camera from a first camera group. If the second image matches the corresponding first image of each camera in the first camera group and the switch interval elapses, the first channels of the ADCs are switched to second channels to acquire images from each camera in a second camera group.

20 Claims, 8 Drawing Sheets

DIGITAL VIDEO RECORDER AND MANAGING METHOD

BACKGROUND

1. Technical Field

Embodiments of the present disclosure relate to device management, and more particularly to a digital video recorder (DVR) and a managing method of the DVR.

2. Description of Related Art

DVRs may be used to perform security surveillance by acquiring captured images of monitored scenes, and sending the captured images to a monitoring computer. A DVR may have multiple channels to connect with cameras, such as, 4 channels, 8 channel, 16 channels, for example. A number of the cameras is equal to a number of the channels of the DVR, for example, 4-channel DVR is only connected to 4 cameras. If many cameras need to be connected to a DVR to acquire more images of the monitored scenes, people have to use the DVR having many channels. Accordingly, the cost of buying the DVR having many channels will be expensive.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, Java, C, or Assembly, for example. One or more software instructions in the modules may be embedded in firmware, such as an erasable programmable read only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
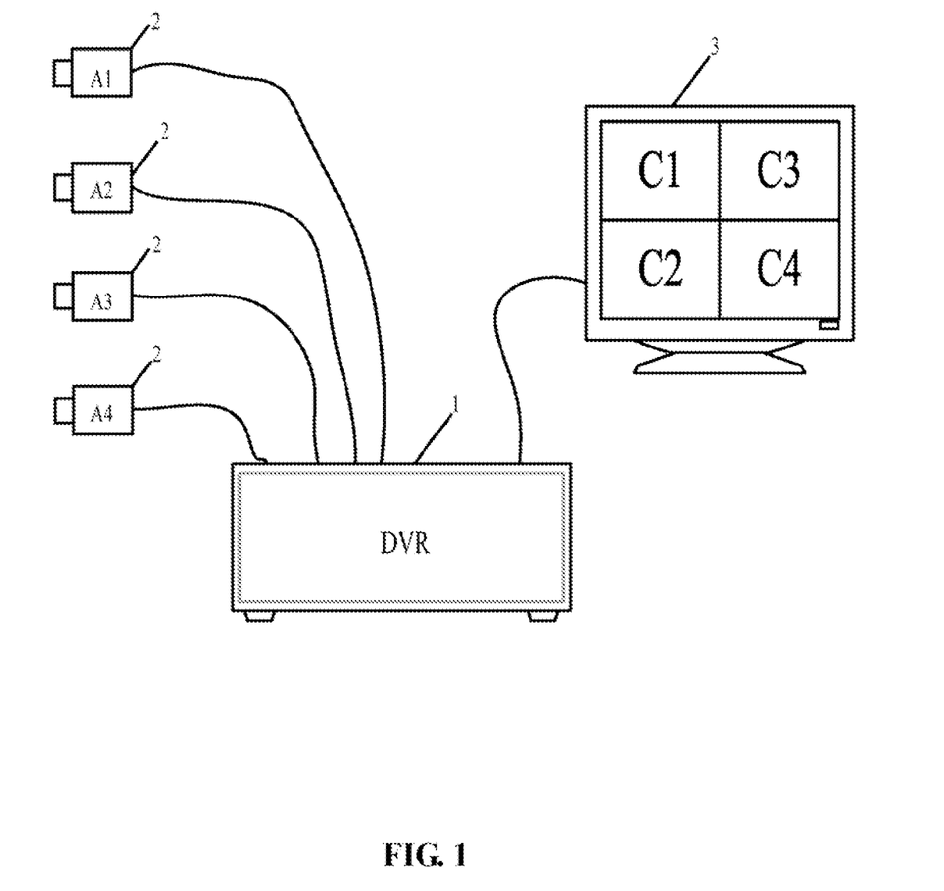
FIG. 1 is a schematic diagram of a first embodiment of a digital video recorder (DVR) in communication with a plurality of cameras.

FIG. 1 is a schematic diagram of a first embodiment of a digital video recorder (DVR) 1 in communication with a plurality of cameras 2. The DVR 1 is an electronic device. In the first embodiment, the DVR 1 as shown in FIG. 1 has four channels. Thus, the DVR 1 merely connects to four cameras 2 to acquire images. In other embodiments, the DVR 1 may be eight channels, sixteen channels, for example. The DVR 1 further connects to a monitor 3 to output the acquired images. The first embodiment shows a current usage of the DVR 1.

Figure 2:
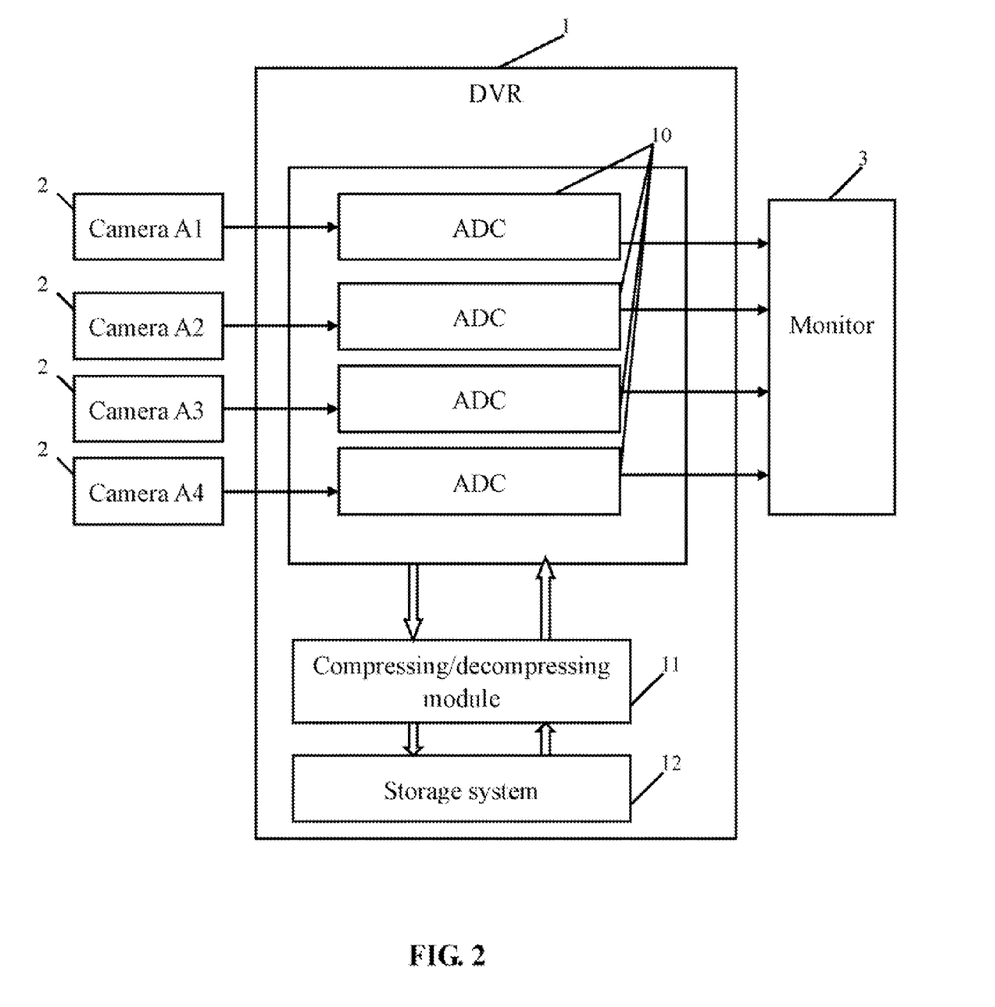
FIG. 2 is a schematic diagram of a first embodiment of data transmission using the DVR of FIG. 1.

FIG. 2 is a schematic diagram of a first embodiment of data transmission using the DVR 1 of FIG. 1. The DVR 1 includes four analog to digital converters (ADCs) 10, a processing module 11, and a storage system 12. Each of the ADCs 10 may acquire the images from one camera 2, and may convert analog signals of the images to digital signals. The processing module 11 is used to process the images, and store the processed images in the storage system 12. Detailed descriptions regarding the image processing are provided below. The ADCs 10 further converts digital signals of the processed images to compatible signals, and outputs the compatible signals of the processed images to the monitor 3.

The first embodiment shows a current data transmission using the DVR 1 of FIG. 1. Detailed descriptions of data processing and data transmission are referred to FIG. 5 as provided below.

Figure 3:
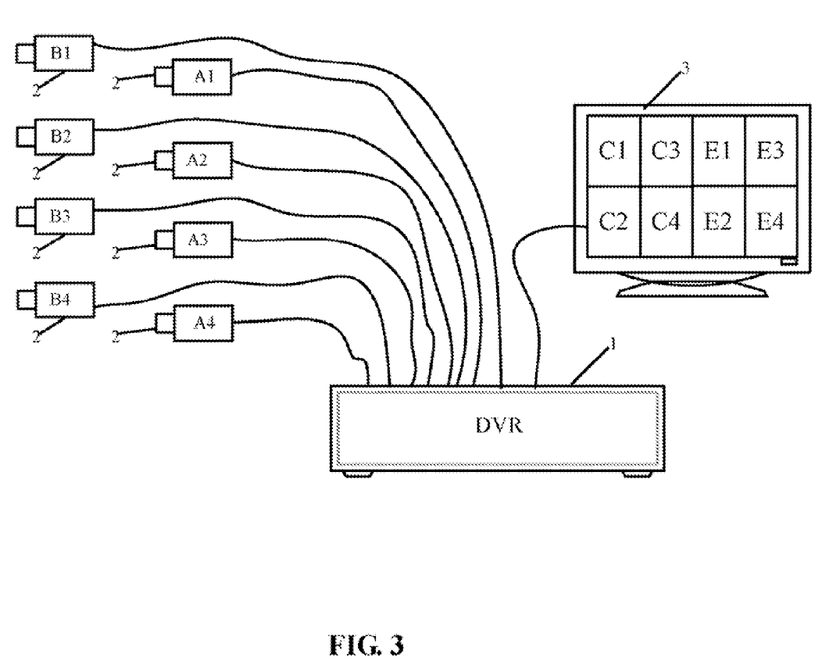
FIG. 3 is a schematic diagram of a second embodiment of the DVR in communication with the plurality of cameras.

FIG. 3 is a schematic diagram of a second embodiment of the DVR 1 in communication with the plurality of cameras 2. As shown in FIG. 3, the DVR 1 having four channels may connect to eight cameras 2. That is, the channels of the DVR 1 are not increased, but more cameras 2 may be connected to acquire more images. Thus, it does not need to buy another DVR having many channels, and the cost of buying DVR having many channels may be avoided. Detailed descriptions are referred to FIG. 5 as provided below.

Figure 4:
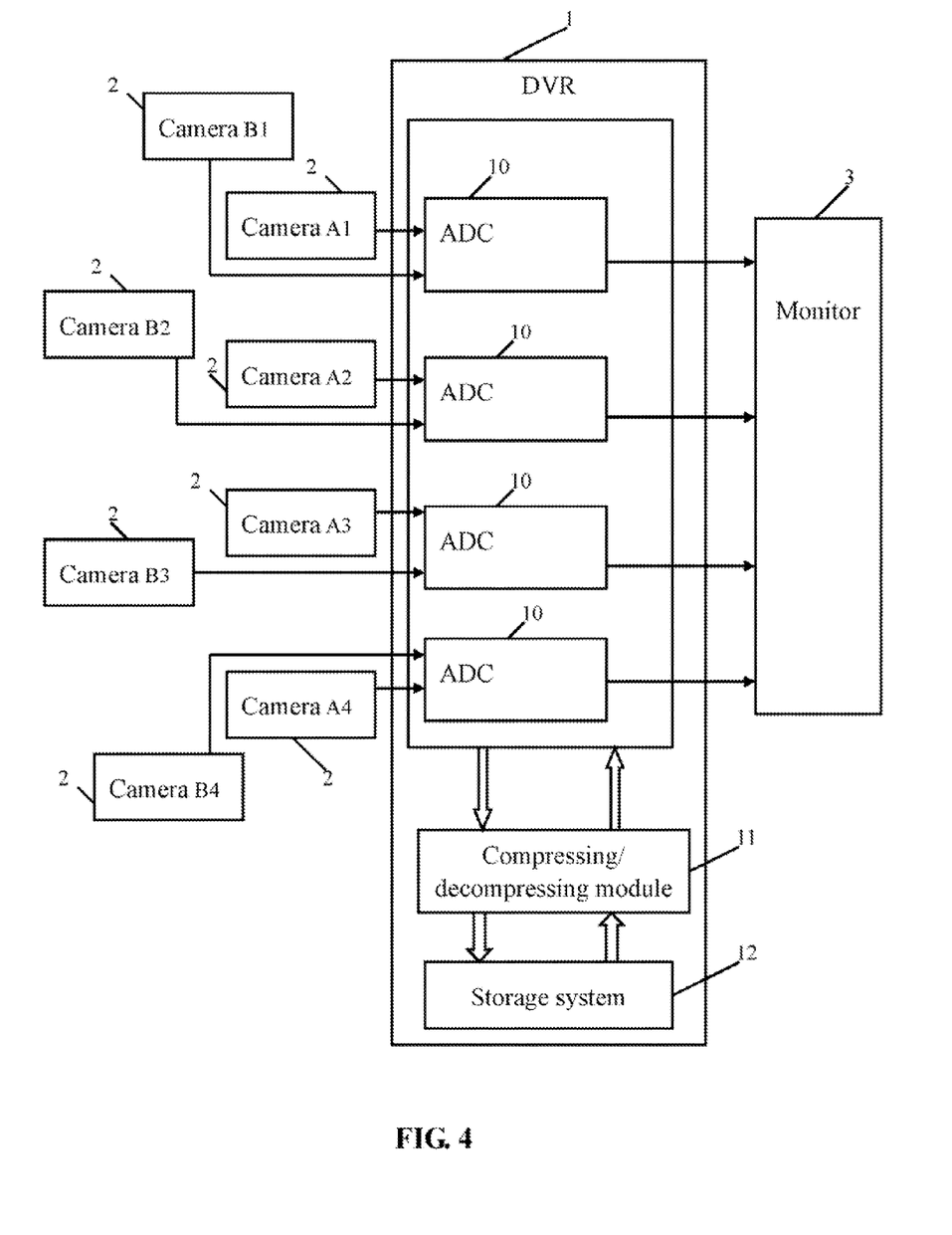
FIG. 4 is a schematic diagram of a second embodiment of the data transmission using the DVR of FIG. 3.

FIG. 4 is a schematic diagram of a second embodiment of the data transmission using the DVR 1 of FIG. 3. The DVR 1 still includes four ADCs 10, the processing module 11, and the storage system 12. That is, the DVR 1 does not need to include more ADCs 10 to acquire or process the images from the cameras.

In some embodiments, each of the ADCs 10 has two channels. In FIG. 2, only one channel of each ADC 10 has been used, in contrast, in FIG. 4, both two channels of each ADC have been used. Each of the ADCs 10 may acquire the images from two cameras 2. For example, camera "A1" and "B1" are both connected to a same ADC 10. Thus, the DVR 1 may be connected to more cameras 2 by using two channels of the ADCs 10 without adding more ADCs 10. Detailed descriptions are referred to FIG. 5 as provided below.

Figure 5:
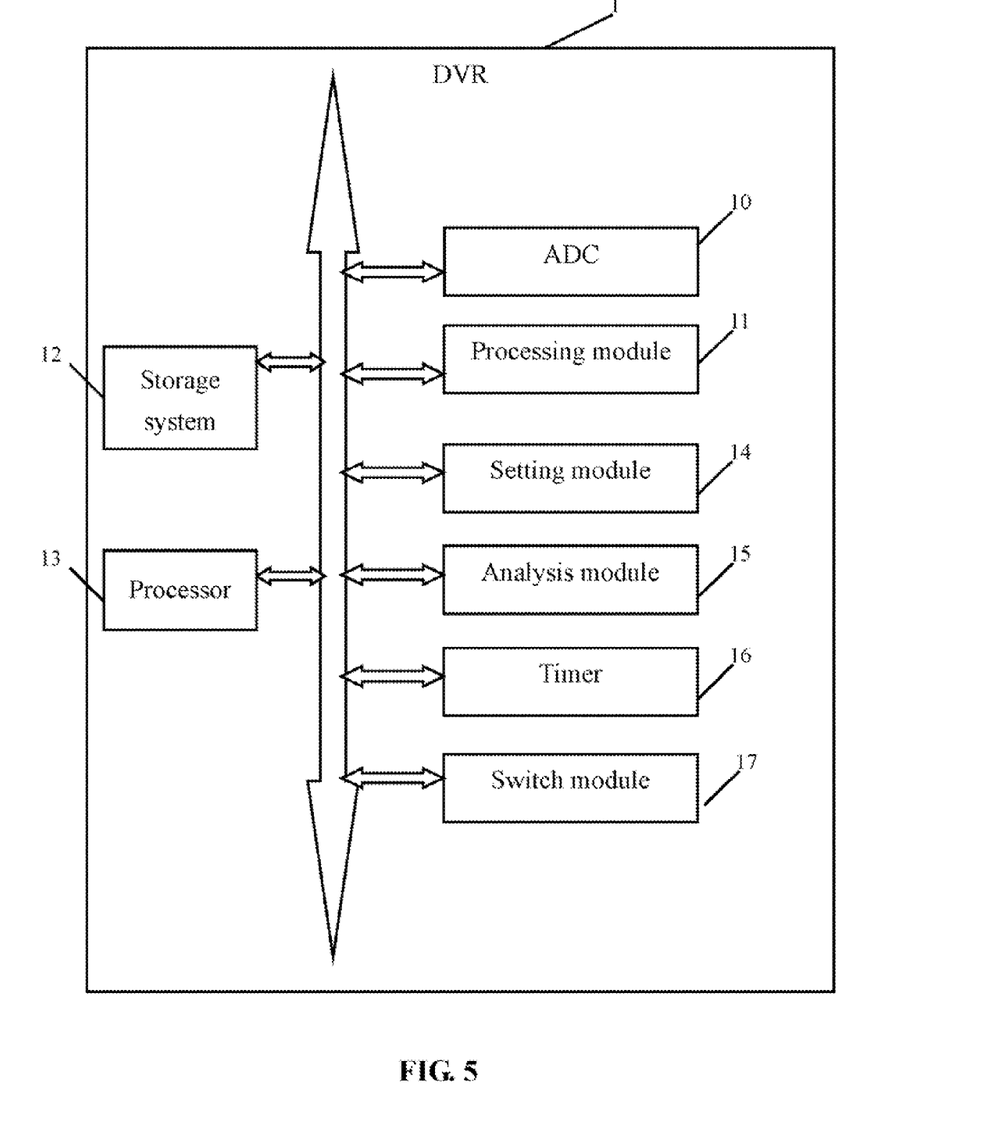
FIG. 5 is a block diagram of one embodiment of the DVR of FIG. 3.

FIG. 5 is a block diagram of one embodiment of the DVR 1 of FIG. 3. The DVR 1 includes a processor 13. The processor 13 executes one or more computerized operations of the DVR 1 and other applications, to provide functions of the DVR 1. The storage system 12 of the DVR 1 stores one or more programs, such as programs of the operating system, other applications of the DVR 1, and various kinds of data, such as preset information. In one embodiment, the storage system 12 may include a memory of the DVR 1 and/or an external storage card, such as a memory stick, a smart media card, a compact flash card, or any other type of memory card.

In some embodiments, the DVR 1 further includes a setting module 14, an analysis module 15, a timer 16, and a switch module 17 except the ADCs 10 and the processing module 11. The modules 11 and 14-17 may include computerized codes in the form of one or more programs that are stored in the storage system 12. The computerized codes include instructions that are executed by the at least one processor 13 to provide functions for modules 11 and 14-17. Details of these functions will be provided below.

The setting module 13 arranges the plurality of cameras 2 into two camera groups. For example, as shown in FIG. 3, a first camera group includes cameras A1, A2, A3, and A4, and a second camera group includes cameras B1, B2, B3, and B4. The setting module 13 further sets a switch interval to switch the first channels and the second channels of the ADCs 10.

After beginning to perform security surveillance, each of the ADCs 10 uses the first channels to acquire a first image from each camera 2 in the first camera group, and the timer 16 starts to time the switch interval simultaneously. In addition, each of the ADCs 10 may converts analog signals of the first image of each camera 2 in the first camera group into digital signals. It should be noted that, if the ADCs 10 acquire digital images from the cameras 2 directly, the ADCs 10 do not need to convert signals of the digital images.

The processing module 11 compresses the first image of each camera 2 in the first camera group, and stores each compressed first image in the storage system 12. In some embodiments, the processing module compresses each first image using the moving pictures experts group (MPEG) 4, or the H.264 standard.

The processing module 11 further combines all of the first images of the cameras 2 in the first camera group into a first combined image. For example, the first combined image may include first images C1, C2, C3, and C4 acquired from the cameras A1, A2, A3, and A4. The ADCs 10 may convert digital signals of the first combined image into compatible signals, and outputs the compatible signals of the first combined image to the monitor 3. For example, the compatible signals may be analog signals.

Each of the ADCs 10 further acquires a second image from each camera 2 in the first camera group, and may convert analog signals of the second image of each camera 2 in the first camera group into digital signals.

The processing module 11 compresses the second image of each camera 2 in the first camera group, and stores each compressed second image in the storage system 12. The processing module 11 further combines all of the second images of the cameras 2 in the first camera group into a second combined image. For example, the second combined image may include second images D1, D2, D3, and D4 acquired from the cameras A1, A2, A3, and A4.

The ADCs 10 converts digital signals of the second combined image into compatible signals, and outputs the compatible signals of the second combined image to the monitor 3. The first combined image is replaced by the second combined image to update display images on the monitor 3.

After compressing the second image of each camera 2 in the first camera group, the analysis module 15 analyzes the first image and the second image of each camera 2 in the first camera group, and determines if the second image of each camera 2 in the first camera group matches the corresponding first image of the camera 2.

Specifically, the analysis module 15 selects a first image (e.g., the image C1) of one camera 2 (e.g., the camera A1) in the first camera group, and determines a second image (e.g., the image D1) corresponding to the selected first image of the camera 2 (e.g., the camera A1) in the first camera group. The analysis module 15 further divides the selected first image (e.g., the camera A1) and the determined second image (e.g., the images D1) of the camera 2 into a plurality of regions. The analysis module 15 compares each region of the selected first image with a corresponding region of the determined second image, to determine a match rate between each region of the selected first image and the corresponding region of the determined second image. In some embodiments, the match rate represents a percentage of similarity between the determined second image and the selected first image of the camera 2. A number of the regions may be preset by the setting module 14, such as 100 regions.

If the match rate between each region of the selected first image and the corresponding region of the determined second image is larger than a predetermined standard rate, the analysis module 15 determines that the determined second image matches the selected first image of the camera 2 in the first camera group. If the match rate between each region of the selected first image and each region of the determined second image is equal to or smaller than the predetermined standard rate, the analysis module 15 determines that the determined second image does not match the selected first image of the camera 2 in the first camera group. The predetermined standard rate (e.g., 90%) may be set by the setting module 14.

If one of the second images does not match corresponding first image of one camera 2 in the first camera group, the ADCs 10 continues to acquire third image of each camera 2 in the first camera group, and the timer 16 restarts to time the switch interval. For example, camera A1 is used to monitor an unmanned location. If a person gets into the unmanned location, the camera A1 would capture a specific image of the person. The specific image is determined to be different from a previous image that the person does not get into the unmanned location yet. Thus, the camera A1 needs to continue monitor the unmanned location, and the first camera group is not switched to the second camera group.

If the second image matches the corresponding first image of each camera 2 in the first camera group within the switch interval, the ADCs 10 continue to acquire third image of each camera 2 in the first camera group, and the timer 16 continues to time until the switch interval elapses.

If the second image matches the corresponding first image of each camera 2 in the first camera group and the switch interval elapses, the switch module 17 switches the first channels of the ADCs 10 to the second channels. It should be noted that, the first image and the second image are only examples to describe the embodiments as mentioned above, and it should not be limited in actual use. That is, in other embodiments, it may be a third image that matches the second image of each camera 2 in the first camera group and the switch interval elapses, then the switch module 17 switches the first channels of the ADCs 10 to the second channels.

Similarly, the ADCs 10 acquire first images from each camera 2 in the second camera group using the second channels of the ADCs 10. A first combined image including first images of cameras 2 in the second camera group may be acquired and output to the monitor 3. For example, the first combined image of the cameras 2 in the second camera group may include images E1, E2, E3, and E4.

As shown in FIG. 3, a display area of the monitor 3 may be divided into two sub areas to display combined images of the first camera group and the second camera group.

Figure 6:
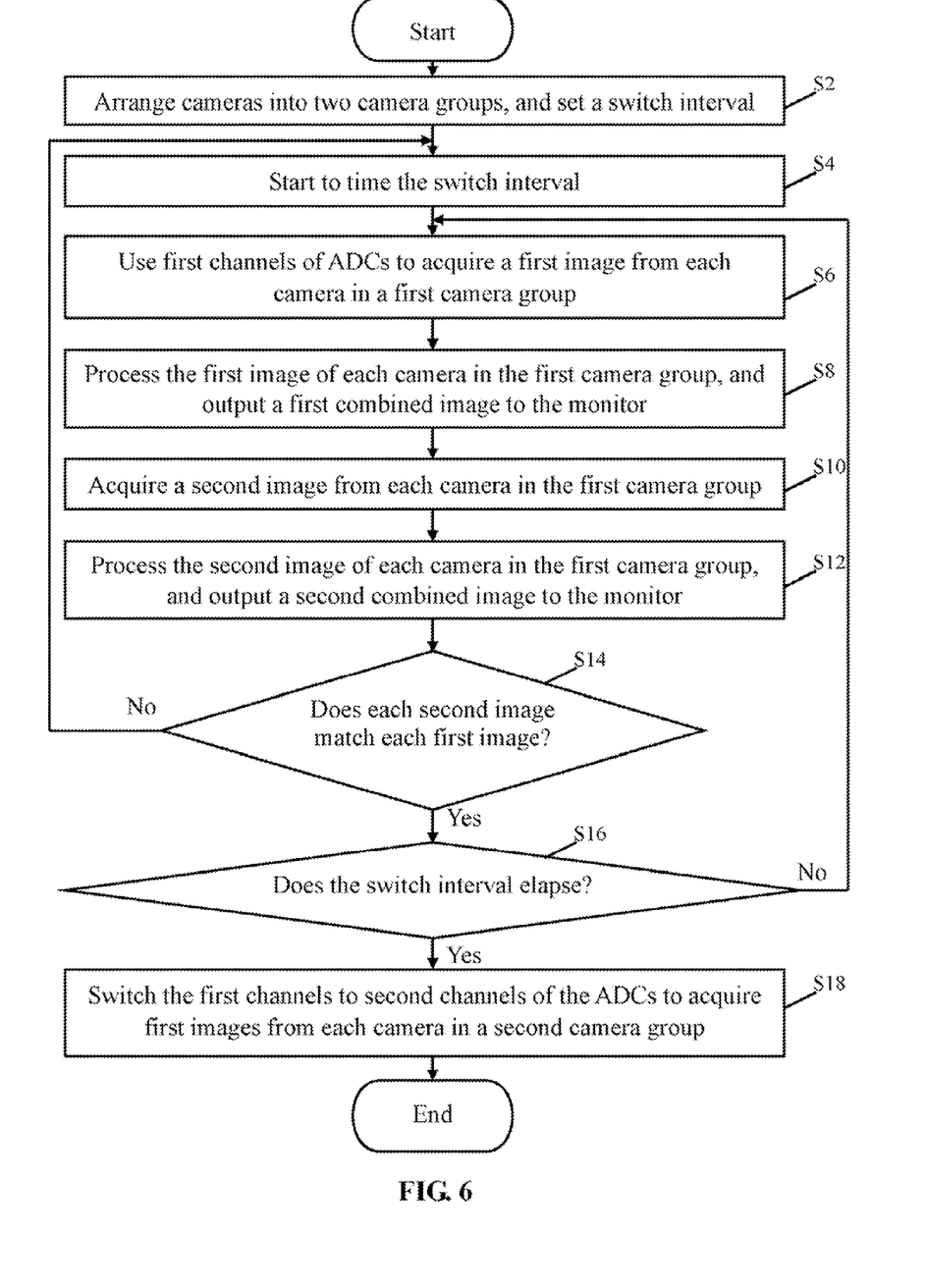
FIG. 6 is a flowchart of one embodiment of a managing method of the DVR of FIG. 5.

FIG. 6 is a flowchart of one embodiment of a managing method of the DVR 1 of FIG. 5. Depending on the embodiment, additional blocks may be added, others removed, and the ordering of the blocks may be replaced.

In block S2, the setting module 13 arranges the plurality of cameras 2 into two camera groups, and sets a switch interval to switch the first channels and the second channels of the ADCs 10. For example, as shown in FIG. 3, a first camera group includes cameras A1, A2, A3, and A4, and a second camera group includes cameras B1, B2, B3, and B4.

In block S4, the timer 16 starts to time the switch interval simultaneously. In block S6, each of the ADCs 10 uses the first channels to acquire a first image from each camera 2 in the first camera group, and converts analog signals of the first image of each camera 2 in the first camera group into digital signals.

In block S8, the processing module 11 processes the first image of each camera 2 in the first camera group, and outputs a first combined image to the monitor 3. Detailed descriptions regarding block S8 are referred to FIG. 7.

In block S10, each of the ADCs 10 further acquires a second image from each camera 2 in the first camera group, and converts analog signals of the second image of each camera 2 in the first camera group into digital signals.

In block S12, the processing module 11 processes the second image of each camera 2 in the first camera group, and outputs a second combined image to the monitor 3. Detailed descriptions regarding block S12 are similar to block S8.

In block S14, the analysis module 15 determines if the second image of each camera 2 in the first camera group matches the corresponding first image of the camera 2. Detailed descriptions regarding block S14 are referred to FIG. 8.

Upon the condition that any of the second image of the camera 2 in the first camera group does not match the corresponding first image, the procedure returns to block S4, and to continue acquiring third image of each camera 2 in the first camera group.

If all of the second images of the cameras 2 in the first camera group match the corresponding first images of the cameras 2, in block S16, the timer 16 determines if the switch interval elapses. If the switch interval does not elapse, the procedure returns to block S6 to acquire third image of each camera 2 in the first camera group. The timer 16 continues timing the switch interval.

If the switch interval elapses, in block S18, the switch module 17 switches the first channels of the ADCs 10 to the second channels to acquire first images from each camera 2 in the second camera group.

Figure 7:
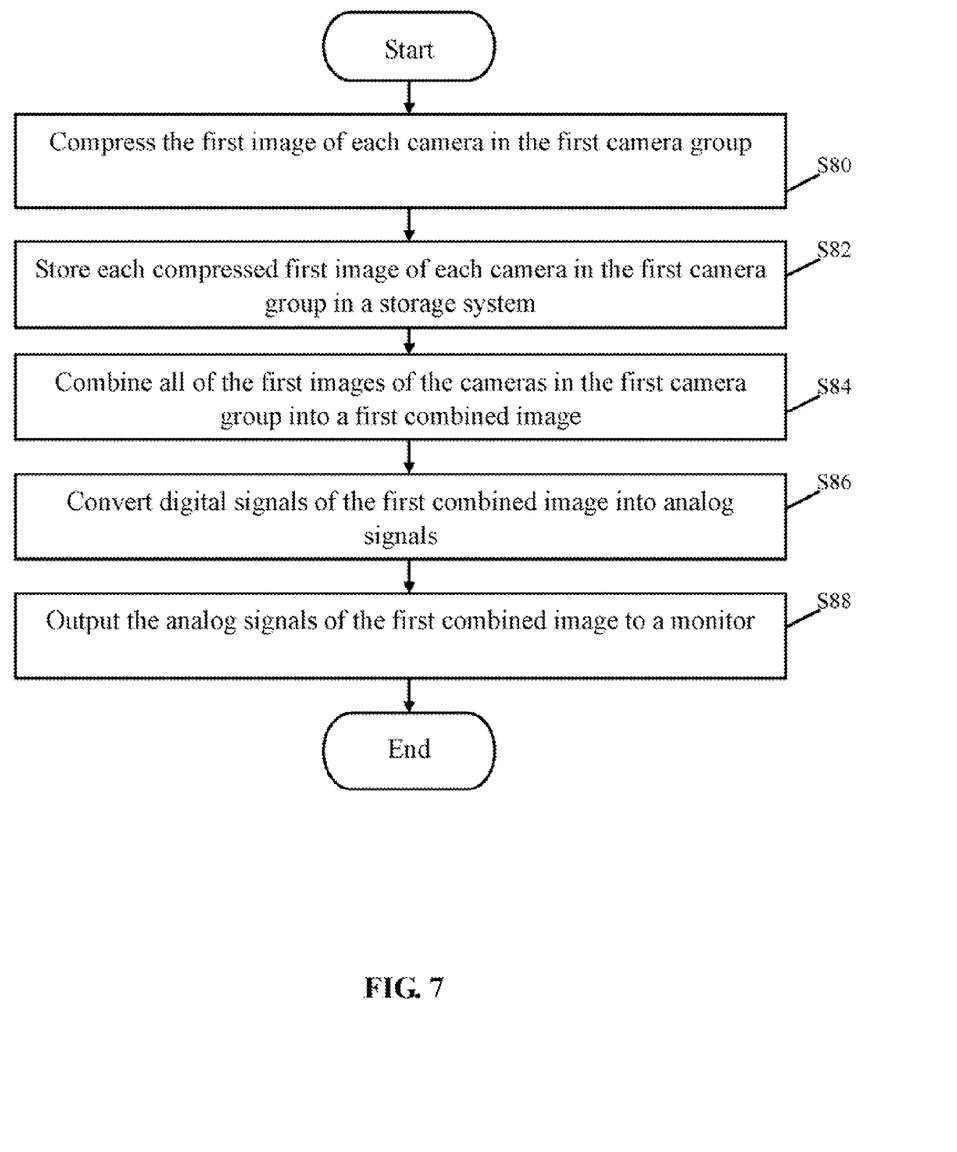
FIG. 7 is a flowchart of one embodiment of detailed descriptions of block S8 of FIG. 6.

FIG. 7 is a flowchart of one embodiment of detailed descriptions of block S8 of FIG. 6. Depending on the embodiment, additional blocks may be added, others removed, and the ordering of the blocks may be replaced.

In block S80, the processing module 11 compresses the first image of each camera 2 in the first camera group. In block S82, the processing module 11 stores each compressed first image in the storage system 12.

In block S84, the processing module 11 combines all of the first images of the cameras 2 in the first camera group into a first combined image. For example, the first combined image may include first images C1, C2, C3, and C4 acquired from the cameras A1, A2, A3, and A4.

In block S86, the ADCs 10 converts digital signals of the first combined image into analog signals. In block S88, the ADCs 10 outputs the analog signals of the first combined image to the monitor 3.

Figure 8:
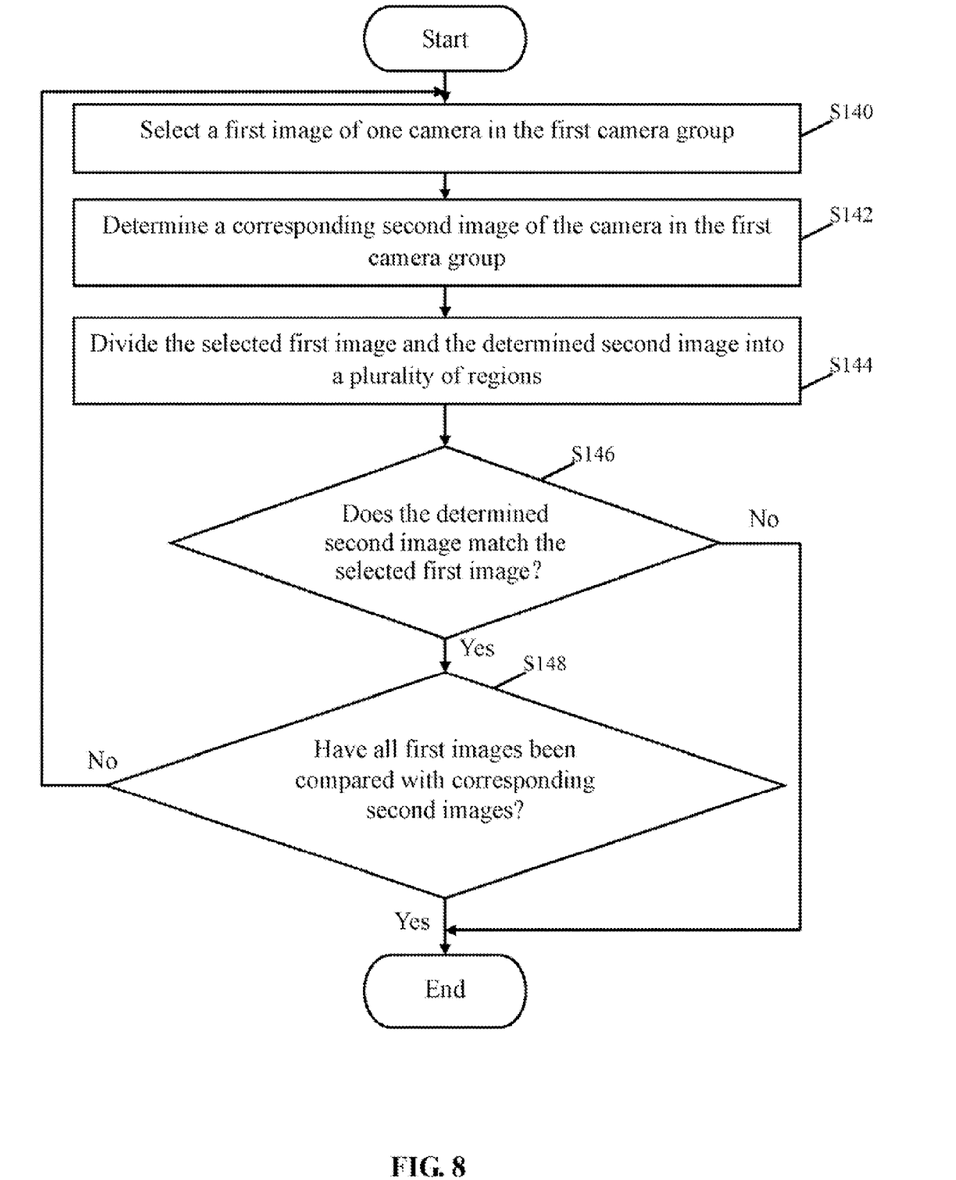
FIG. 8 is a flowchart of one embodiment of detailed descriptions of block S14 of FIG. 6.

FIG. 8 is a flowchart of one embodiment of detailed descriptions of block S14 of FIG. 6. Depending on the embodiment, additional blocks may be added, others removed, and the ordering of the blocks may be replaced.

In block S140, the analysis module 15 selects a first image (e.g., the images C1) of one camera 2 (e.g., the camera A1) in the first camera group. In block S142, the analysis module 15 determines a second image (e.g., the images D1) corresponding to the selected first image of the camera 2 in the first camera group.

In block S144, the analysis module 15 divides the selected first image (e.g., the camera A1) and the determined second image (e.g., the images D1) of the camera 2 into a plurality of regions.

In block S146, the analysis module 15 compares each region of the selected first image with a corresponding region of the determined second image to determine a match rate between the determined second image and the selected first image of the camera 2.

If the match rate between each region of the selected first image and each region of the determined second image is equal to or smaller than the predetermined standard rate, the analysis module 15 determines that the determined second image does not match the selected first image of the camera in the first camera group, and the procedure ends.

If a match rate between each region of the selected first image and each region of the determined second image is larger than a predetermined standard rate, the analysis module 15 determines that the determined second image matches the selected first image of the camera in the first camera group, and then the procedure goes to block S148.

In block S148, the analysis module 15 determines if each first image has been compared with the corresponding second image of each cameras 2 in the first camera group.

If all of the first images has been compared with the corresponding second images of the cameras 2 in the first camera group, the procedure ends. If there are any first images that have not been compared with the corresponding second images, the procedure returns to block S140.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A control method of an electronic device, the electronic device in communication with a plurality of cameras and a monitor, the electronic device comprising a plurality of analog to digital converters (ADCs) and a storage system, the method comprising:
   arranging the plurality of cameras into a first camera group and a second camera group, and setting a switch interval;
   starting to time the switch interval, and acquire a first image and a second image from each camera in the first camera group by first channels of the plurality of ADCs;
   determining whether the second image of each camera in the first camera group matches the corresponding first image of the camera; and
   switching the first channels to second channels of the plurality of ADCs to acquire images from each camera in the second camera group upon the condition that the second image of each camera in the first camera group matches the corresponding first image of the camera within the switch interval.

2. The method according to claim 1, further comprising:
   combining all of the first images of the cameras in the first camera group into a first combined image after acquiring the first image of each camera in the first camera group;
   converting digital signals of the first combined image into analog signals using the plurality of ADCs; and
   outputting the analog signals of the first combined image to the monitor.

3. The method according to claim 1, further comprising:
   converting analog signals of the first image of each camera in the first camera group into digital signals;
   compressing the first image of each camera in the first camera group; and
   storing the compressed first image of each camera in the first camera group in the storage system of the electronic device.

4. The method according to claim 1, further comprising:
converting analog signals of the second image of each camera in the first camera group into digital signals;
compressing the second image of each camera in the first camera group; and
storing the compressed second image of each camera in the first camera group in the storage system of the electronic device.

5. The method according to claim 1, wherein the step of determining whether the second image of each camera in the first camera group matches the corresponding first image of the camera comprising:
selecting the first image of one camera in the first camera group, and determining a corresponding second image of the camera in the first camera group; and
dividing the selected first image and the determined second image into a plurality of regions.

6. The method according to claim 5, wherein the step of determining whether the second image of each camera in the first camera group matches the corresponding first image of the camera further comprises:
comparing each region of the selected first image with a corresponding region of the determined second image; and
determining that the determined second image matches the selected first image when a match rate between each region of the selected first image and each region of the determined second image is larger than a predetermined standard rate; or
determining that the determined second image does not match the selected first image when the match rate between each region of the selected first image and each region of the determined second image is equal to or smaller than the predetermined standard rate.

7. An electronic device, the electronic device in communication with a plurality of cameras and a monitor, the electronic device comprising:
a plurality of analog to digital converters (ADCs), each of the plurality of ADCs having a first channel and a second channel;
a storage system;
at least one processor; and
one or more programs stored in the storage system and being executable by the at least one processor, the one or more programs comprising a setting module, a timer, a processing module, an analysis module, and a switch module:
the setting module being operable to arrange the plurality of cameras into a first camera group and a second camera group, and set a switch interval;
the timer being operable to start to time the switch interval;
the plurality of ADCs being operable to acquire a first image and a second image from each camera in the first camera group by the first channels;
the analysis module being operable to determine whether the second image of each camera in the first camera group matches the corresponding first image of the camera; and
the switch module being operable to switch the first channels to the second channels of the plurality of ADCs to acquire images from each camera in the second camera group upon the condition that the second image of each camera in the first camera group matches the corresponding first image of the camera within the switch interval.

8. The electronic device according to claim 7, wherein the processing module is operable to combine all of the first images of the cameras in the first camera group into a first combined image, and combine all of the second images of the cameras in the first camera group into a second combined image.

9. The electronic device according to claim 8, wherein the plurality of ADCs are further operable to convert digital signals of the first combined image and the second combined image into analog signals, and output the analog signals of the first combined image and the second combined image to the monitor.

10. The electronic device according to claim 7, wherein the plurality of ADCs are further operable to convert analog signals of the first image and the second image of each camera in the first camera group into digital signals, and the processing module is further operable to compress the first image and the second image of each camera in the first camera group, and store the compressed first image and the compressed second image of each camera in the first camera group in the storage system.

11. The electronic device according to claim 7, wherein the analysis module determines whether the second image of each camera in the first camera group matches the corresponding first image of the camera by:
selecting the first image of one camera in the first camera group, and determining a corresponding second image of the camera in the first camera group; and
dividing the selected first image and the determined second image into a plurality of regions.

12. The electronic device according to claim 11, wherein the analysis module is further operable to determine whether the second image of each camera in the first camera group matches the corresponding first image of the camera by comparing each region of the selected first image with a corresponding region of the determined second image.

13. The electronic device according to claim 12, wherein the analysis module determines that the determined second image matches the selected first image when a match rate between each region of the selected first image and each region of the determined second image is larger than a predetermined standard rate.

14. The electronic device according to claim 7, wherein the electronic device is a digital video recorder (DVR).

15. A non-transitory storage medium storing a set of instructions, the set of instructions capable of being executed by a processor to perform a managing method of an electronic device, the electronic device in communication with a plurality of cameras and a monitor, the electronic device comprising a plurality of analog to digital converters (ADCs) and a storage system, the method comprising:
arranging the plurality of cameras into a first camera group and a second camera group, and setting a switch interval;
starting to time the switch interval, and acquire a first image and a second image from each camera in the first camera group by first channels of the plurality of ADCs;
determining whether the second image of each camera in the first camera group matches the corresponding first image of the camera; and
switching the first channels to second channels of the plurality of ADCs to acquire images from each camera in the second camera group upon the condition that the second image of each camera in the first camera group matches the corresponding first image of the camera within the switch interval.

16. The non-transitory storage medium as claimed in claim 15, wherein the method further comprises:
  combining all of the first images of the cameras in the first camera group into a first combined image after acquiring the first image of each camera in the first camera group;
  converting digital signals of the first combined image into analog signals using the plurality of ADCs; and
  outputting the analog signals of the first combined image to the monitor.

17. The non-transitory storage medium as claimed in claim 15, wherein the method further comprises:
  converting analog signals of the first image of each camera in the first camera group into digital signals;
  compressing the first image of each camera in the first camera group; and
  storing the compressed first image of each camera in the first camera group in the storage system of the electronic device.

18. The non-transitory storage medium as claimed in claim 15, wherein the method further comprises:
  converting analog signals of the second image of each camera in the first camera group into digital signals;
  compressing the second image of each camera in the first camera group; and
  storing the compressed second image of each camera in the first camera group in the storage system of the electronic device.

19. The non-transitory storage medium as claimed in claim 15, wherein the step of determining whether the second image of each camera in the first camera group matches the corresponding first image of the camera comprising:
  selecting the first image of one camera in the first camera group, and determining a corresponding second image of the camera in the first camera group; and
  dividing the selected first image and the determined second image into a plurality of regions.

20. The non-transitory storage medium as claimed in claim 19, wherein the step of determining whether the second image of each camera in the first camera group matches the corresponding first image of the camera further comprises:
  comparing each region of the selected first image with a corresponding region of the determined second image; and
  determining that the determined second image matches the selected first image when a match rate between each region of the selected first image and each region of the determined second image is larger than a predetermined standard rate; or
  determining that the determined second image does not match the selected first image when the match rate between each region of the selected first image and each region of the determined second image is equal to or smaller than the predetermined standard rate.

\* \* \* \* \*